United States Patent [19]
Schweyer et al.

[11] Patent Number: 5,762,292
[45] Date of Patent: Jun. 9, 1998

[54] APPARATUS FOR IDENTIFICATION AND TRACKING OF OBJECTS

[75] Inventors: Nikolaus Schweyer, München; Fred Holick, Taufkirchen; Rudolf Pfefferle, Otterfing, all of Germany

[73] Assignee: Daimler-Benz Aerospace AG, München, Germany

[21] Appl. No.: 411,158

[22] Filed: Sep. 11, 1989

[51] Int. Cl.$^6$ .................................................... F41G 7/22
[52] U.S. Cl. .................................................. 244/3.17
[58] Field of Search ........................................ 244/3.17

[56] References Cited

U.S. PATENT DOCUMENTS

| | | | |
|---|---|---|---|
| 3,071,765 | 1/1963 | Schutz | 244/3.17 |
| 4,881,270 | 11/1989 | Knecht et al. | 344/3.17 |

FOREIGN PATENT DOCUMENTS

| | | | |
|---|---|---|---|
| 5918 | 12/1979 | European Pat. Off. | 244/3.17 |
| 29 14 639 | 5/1982 | Germany . | |
| 3110691 | 10/1982 | Germany | 244/3.17 |
| 34 27 020 | 1/1986 | Germany . | |
| 36 22 064 | 1/1988 | Germany . | |
| 2164427 | 3/1986 | United Kingdom | 244/3.17 |

Primary Examiner—Charles T. Jordan
Attorney, Agent, or Firm—McGlew and Tuttle

[57] ABSTRACT

Target acquisition device with an imaging sensor, a signal processing circuit and an evaluating circuit comprising a computer for implementing a gray-value analysis of the output signals of the imaging sensor, wherein the signal processing circuit contains threshold value transmitters for the brightness transitions and for the local extreme values, a selection of three values, bright/reference/dark, is effected in the signal evaluation circuit and a centroid of the target is determined from the latter, particularly by means of producing coordinates of the target, and, in order to acquire the target according to the position finding by means of comparison of the measured parameters with the stored parameters in the evaluating circuit, the computer also evaluates the mathematical signs of the received gradient image for determining the target direction, and in that, in addition to a binary image, edges and non-edges, edge points lying on a straight line can also be obtained, particularly from one or more image sections.

9 Claims, 5 Drawing Sheets

OBJECT CONTOUR, EXAMPLE

·········· ACCORDING TO SEGMENTATION

——— COARSENED FOR THE CONTOUR ANALYSIS

HOUGH PLANE

APPARATUS FOR IDENTIFICATION AND TRACKING OF OBJECTS

The invention is directed to a device for the acquisition of structures which comprise straight portions at least in part and which comprise, in the area of the portions, a known configuration which can be stored in a computer, so that structure and/or objects are identifiable.

It has been possible for a long time in navigating methods to approach a determined target area by means of inertial navigation. However, the accuracy is usually not sufficient for attacking pin-point targets and (with one shot) particularly moving targets. Such a target approach always presupposes prior target position finding or target acquisition. This can be effected by active or passive methods by means of receivers, sensors, cameras, etc. Usually, the path into the surrounding region of the target area is already given beforehand, and a target finding and acquisition device only becomes necessary for the target approach. In recent aviation electronics, there is a desire to profit meaningfully from computer-technology, e.g. as is described in the journal "Electronics" of May 15, 1987, pages 8 and 9, in that digitized navigation maps are used. The digitally stored maps are retrieved from the computer memory by portions and compared in an image correlator with the image which has just been received from a so-called "forward-looking sensor" or a TV camera.

This navigation principle can also be applied to the acquisition of stationary targets in that an image of the target is carried along and the sensor image is compared with the latter.

Aside from the fact that this requires a considerable storage capacity which is to be accommodated in the smallest space and must operate in a failure-proof manner, it is necessary to maintain the maps at the most recent status constantly, that is, to update them, in order to exclude errors in the target acquisition. Moreover, there must be current target images during target approach at low altitude from every desired direction, which target images comprise meteorological and seasonal assumptions. Such a raster or scanning method is described e.g. in the German Offenlegungsschrift 2914693. Such methods enable high precision, but are still quite costly with respect to their evaluation and logistics. This applies in the same way, or in a similar way, for the reference recordings and comparisons such as are described in the German Patent 3110691 and the German Offenlegungsschrift 3427020.

It is the object of the invention to provide a target acquisition device which is able to dispense with the image correlation which must be implemented between every received and every stored (total) image of the map.

An additional inventive step concerns using the target acquisition device in a navigating arrangement for missiles which are employed against target objects. Other constructions and developments of the invention, as well as advantages of same, can be seen from the following description and drawing of embodiment examples.

The most substantial advantage of the invention consists in that a description comprising characteristic parameters which are independent of the time of day or year and of the approach direction is sufficient for acquisition e.g. of road-like structures or other typical structures, and in that these parameters can be derived in a simple manner from conventional maps, wherein the availability of digital maps facilitates the derivation of the parameters, and in that this method is very stable relative to disturbances (because of these absent edges). The primary data for acquisition, e.g. in structures similar to roads or other structures with transitions, lies in the edges. The edges and non-edges can be reliably detected from the differences in brightness, e.g. between a road and the edge of the road, river bank (surrounding field, terrain).

Only a good road map and preliminary briefing carried out with the help of the latter are necessary; but a digitized surface map can be dispensed with. The necessary expenditure or storage and evaluating of the described known image correlation can also be dispensed with accordingly.

In the method and the arrangement or device for implementing same, according to the invention, missiles and/or sensors are aligned with the target in a preliminary manner according to the map and, as soon as they have acquired the target area—at least roughly—the sensor is aligned and followed up in detail and the missile is accordingly also controlled and directed to the target by means of the new navigation device.

This system requires only an imaging sensor and an image processing electronic unit for target acquisition and guidance of the missile toward the target. The mission planning for the missile is very simple and the mission can be implemented autonomously by the device in very simple mission planning, e.g. along a fixed road which the sensor is capable of detecting. Of course, the new device is not limited only to the acquisition of roads and/or objects; rather it is also suitable for carrying out tasks such as are indicated, among others, in the aforementioned German Patent 31 10 691 and the German Offenlegungsschrift 3427020, for rail systems, airports, take-off, landing and taxiing runways and the like. In particular, vehicles of all types and vehicle columns, respectively, can also be detected on the roads or road-like structures with permanent lane lines, transitions, edges and contours. For preliminary briefing, the mission planning includes only determining the type of road and approach course and, accordingly, the touch-down point on the road. The predetermined road or similar system is acquired by means of the known width of the road, e.g. 6 meters in simple roads, and, in addition, by the width of the median in multiple-lane highways, etc., by means of their direction and the time of appearance in the image. However, no images of the sought road are needed. The same applies for other structures such as buildings or other objects with characteristic elements.

An embodiment example of the invention is explained in the following by means of the drawings.

DESCRIPTION OF AN EMBODIMENT EXAMPLE OF THE INVENTION

Figure 1A:
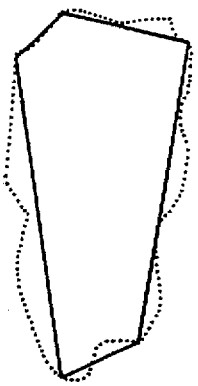
FIG. 1a shows a possible contour of a received object, outlined in dots according to the segmentation, with solid line coarsened for the contour analysis.
Figure 1B:
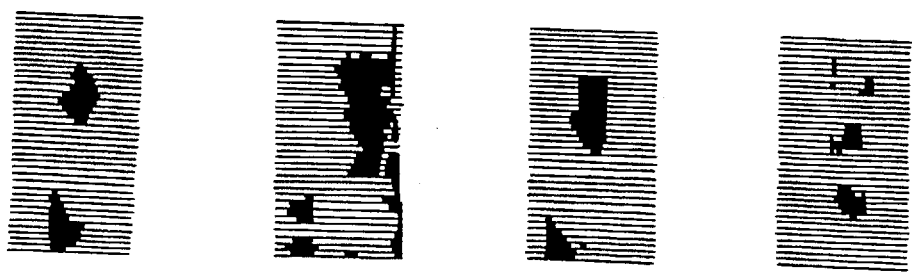
FIG. 1b shows extracts such as are made for segmentation and evaluation during overflight of the forward-looking sensor.
Figure 2A:
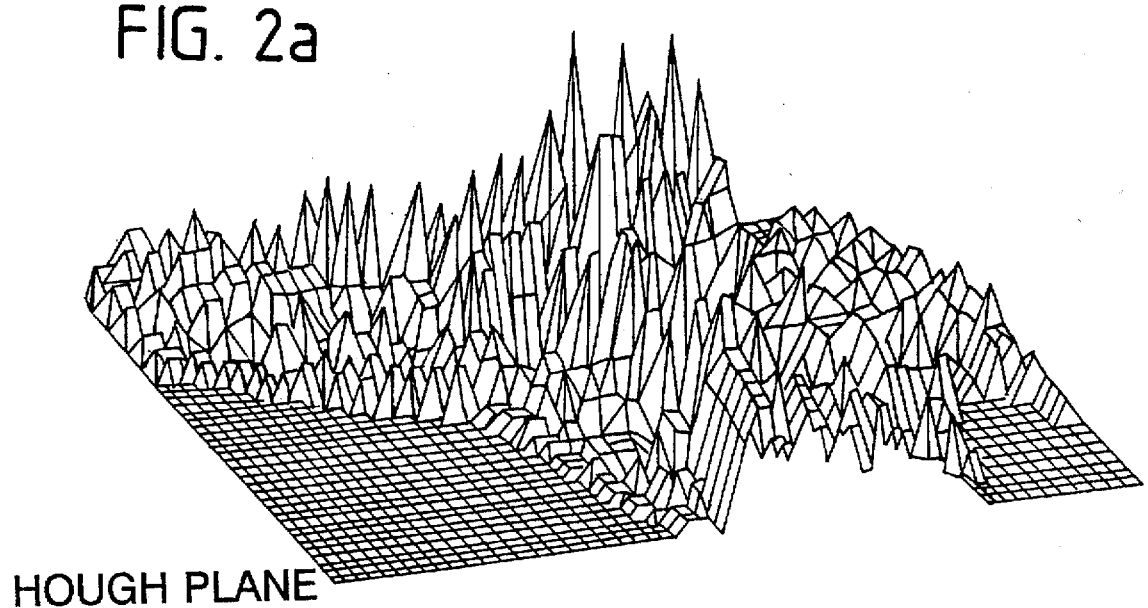
FIG. 2 shows the results of a normal (2a) and complementary (2b) Hough transformation, wherein the mathematical sign of edges is also taken into consideration in the complementary transformation.
FIG. 2c shows the principle of the Hough transformation for detecting straight lines (edges) in the image.
Figure 2B:
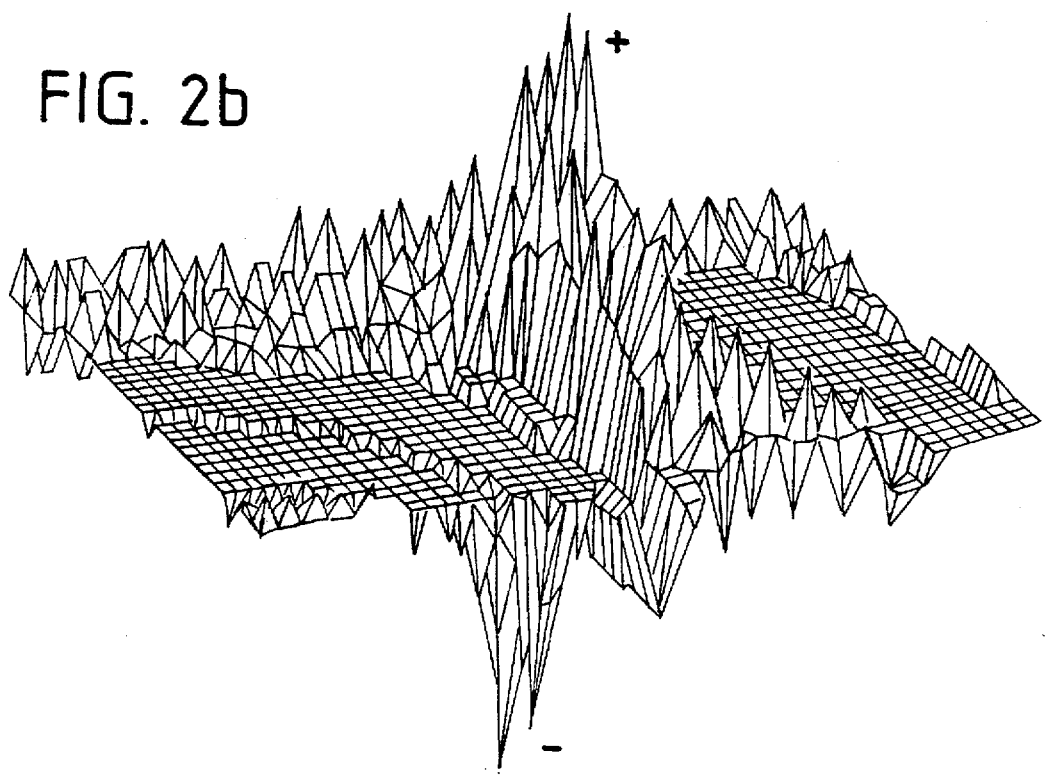
Figure 2C:
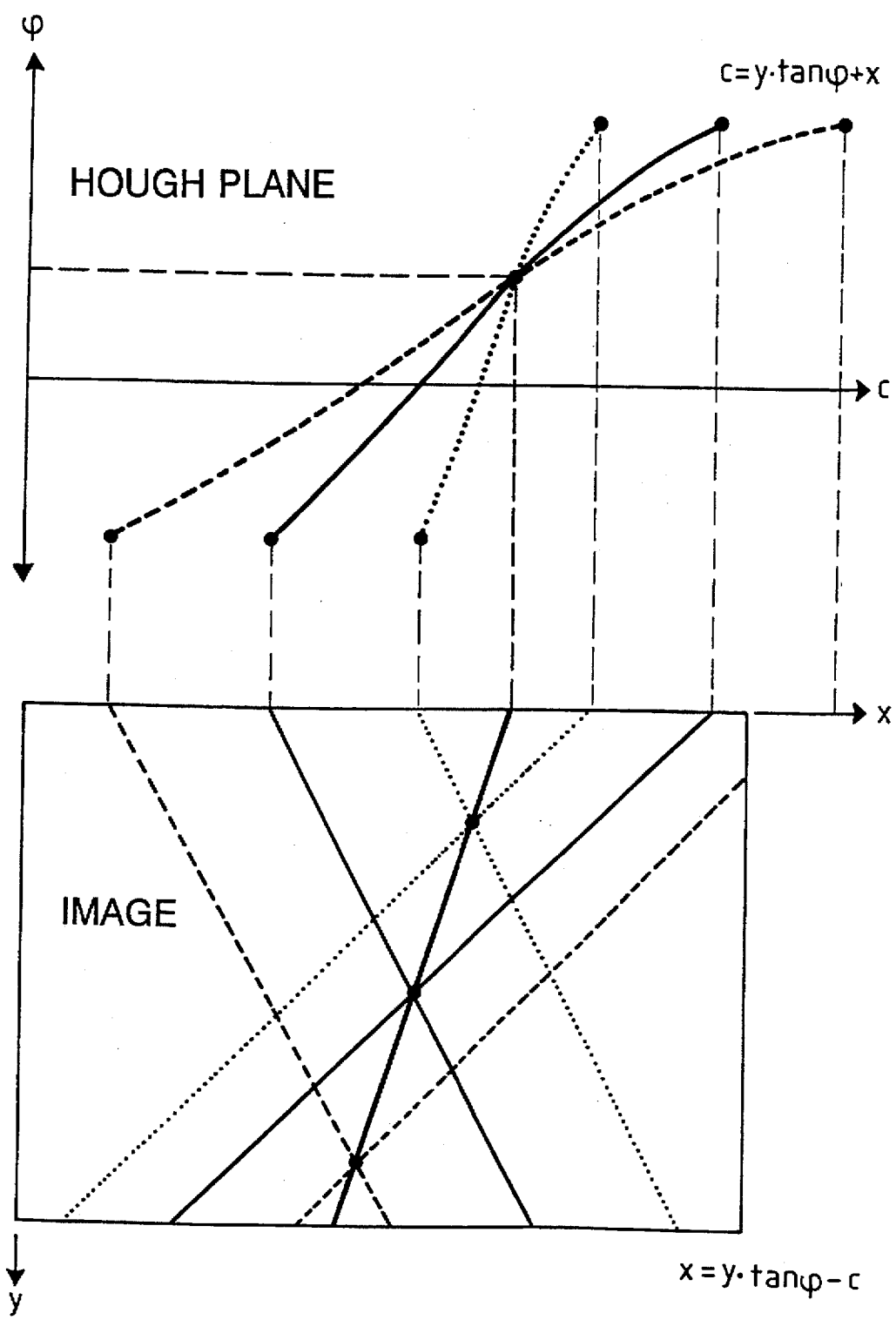
Figure 3:
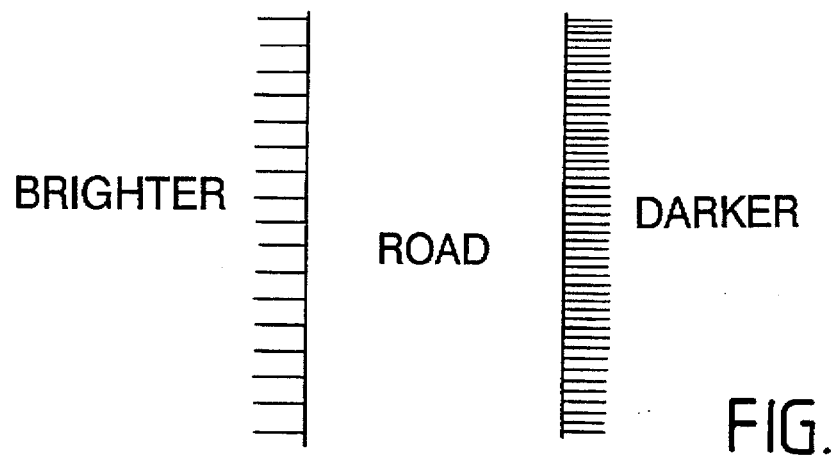
FIG. 3 shows an edge analysis procedure.
Figure 4:
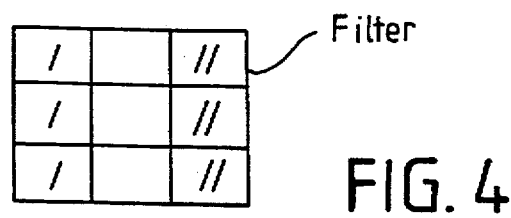
FIG. 4 shows a filter for direction-selective gradient calculation.

The new system of target acquisition and tracking works as a road tracking system with an imaging IR sensor in the missile, which IR sensor is aligned diagonally forward, so that the guidance command to the missile is effected punctually. The IR sensor is stabilized in three axes, so that the road is constantly held in the line of sight of the sensor and the guidance is maintained also during roll maneuvers.

For employment, it is assumed that the missile is brought into the vicinity of the desired road by means of a carrier plane and/or corresponding preliminary guidance methods and that an inertial navigation system package supplies the attitude and altitude of the missile.

The new road tracking system comprises two main components:

sensor system signal processing.

The sensor system contains the heat image device, the 3-axis stabilization and the electronic arrangement for the latter. A corresponding power supply and compressed nitrogen for cooling the detector are required for operation. The image signal is available in digital form. The control of the sensor system and status reports is effected via a serial interface. The sensor system is completely accommodated in the missile tip. The signal processing derives guidance signals for the missile from the images of the sensor system. Moreover, it reports the presence and the positions of vehicles on the road. A connection is made to the missile via an interface. The data for guiding the missile and for controlling and monitoring the road tracking system are transmitted via the interface. The signal processing further comprises an interface to the outside, by means of which an operator device can be connected. Accordingly, self-tests can be triggered or interrogated from a ground station. A video interface for recording the images on conventional video recorders is likewise present.

Target Guidance and Navigation Method

A typical mission course is described in the following. After corresponding mission planning and data transmission to the missile, a carrier plane brings the missile (possibly a plurality of missiles) into the vicinity of the mission area. At a safe distance, the missile is released and it begins the approach to the fixed road by means of its inertial navigation system (INS).

At a suitable distance prior to the touch-down point, the road tracking system is activated. It first starts the search phase in which the desired road is sought. Other roads or similar structures are to be eliminated in this phase. After acquiring the road, the missile is turned toward the road and it begins the road tracking. During this phase, the road is continuously searched for targets and their presence and positions are reported to the missile.

Special Characteristics of the Invention

Use of an imaging sensor (TV, IR, radar, laser) which images the sought road as a strip, i.e. in 2 edges, (sufficient geometric resolutions) and continuously supplies images (CCD/camera, video, heat image device)

Extraction of the edges present in the image by means of determining gradients of brightness with the possibility of operating in direction-selective manner Selection of edge points by means of adaptive threshold value formation and use of local extreme values of the brightness gradients Implementation of a parameter transformation (Hough transformation) with the selected edge points in such a way that collinear edge points, i.e. straight line portions, are marked in the transformation plane (parameter plane) by means of local extreme values—every extreme value corresponds exactly to a straight line in the image. Its coordinates in the parameter plane represent two parameters describing a straight line, e.g. slope and intercept of axis.

The sought road is characterized by its relative direction to the missile (approach direction) and its width, as well as by the approximate time of appearance in the image (derived from the zero position or absolute position when using a navigation system)—direction, width and time constitute the only necessary preliminary data and can be determined by means of conventional, simple map material.

With the aid of the preliminary data on direction and width, the parameter plane is scanned according to two corresponding extreme values (straight lines in image) which best meet the conditions of the sought road. In so doing, the edge polarity and the perspective distortion are also taken into consideration, because the parallel road edges are imaged as two edges running toward one another—use of flight altitude, missile attitude, visual field magnitude and angle of line of sight for calculating this distortion Acquisition of the sought road in two modes a) search mode In this mode, the road candidates are sought in a large expectation range with rough parameter gradation b) precision mode In this mode the found road candidate is repeated, i.e. a plurality of images are analyzed with precision parameter gradation in order to determine the exact direction and width of the road.

Tracking of the found road by means of repeating aforementioned operations in a plurality of image sections which are selected with respect to magnitude and position by means of a prediction for the respective following image in such a way that they cover both road edges. The purpose for selecting a plurality of image sections consists in a reliable tracking with large coverage (the road is most visible in one of the sections) and in the possibility of detecting curves or being able to extrapolate curves in an improved manner with curved configurations.

Determination of the average road brightness and the variance

Segmentation of the image in the area of the localized road accompanied by the use of the gray values or halftones of the original image and also, in addition, the edge data in such a way that the three gray value zones, namely the learned road brightness, all brighter and all darker areas, are distinguished.

Determination of the contours of all objects brighter or darker than the road, which contours are formed by means of the segmentation Analysis of the contours by means of magnitude and shape features for the acquisition of target objects and rejection of all interference objects Implementation of plausibility tests with the target candidates and/or object candidates by means of comparison of the respective magnitude with the distance (calculable from flight altitude, aspect angle and position in the image), accounting for position on the road and multiple confirmation in repeated acquisition operations of additional images.

In FIGS. 1–5, the drawing shows details according to the short description which are comprehensible to one skilled in the art from the illustrations.

Figure 6:
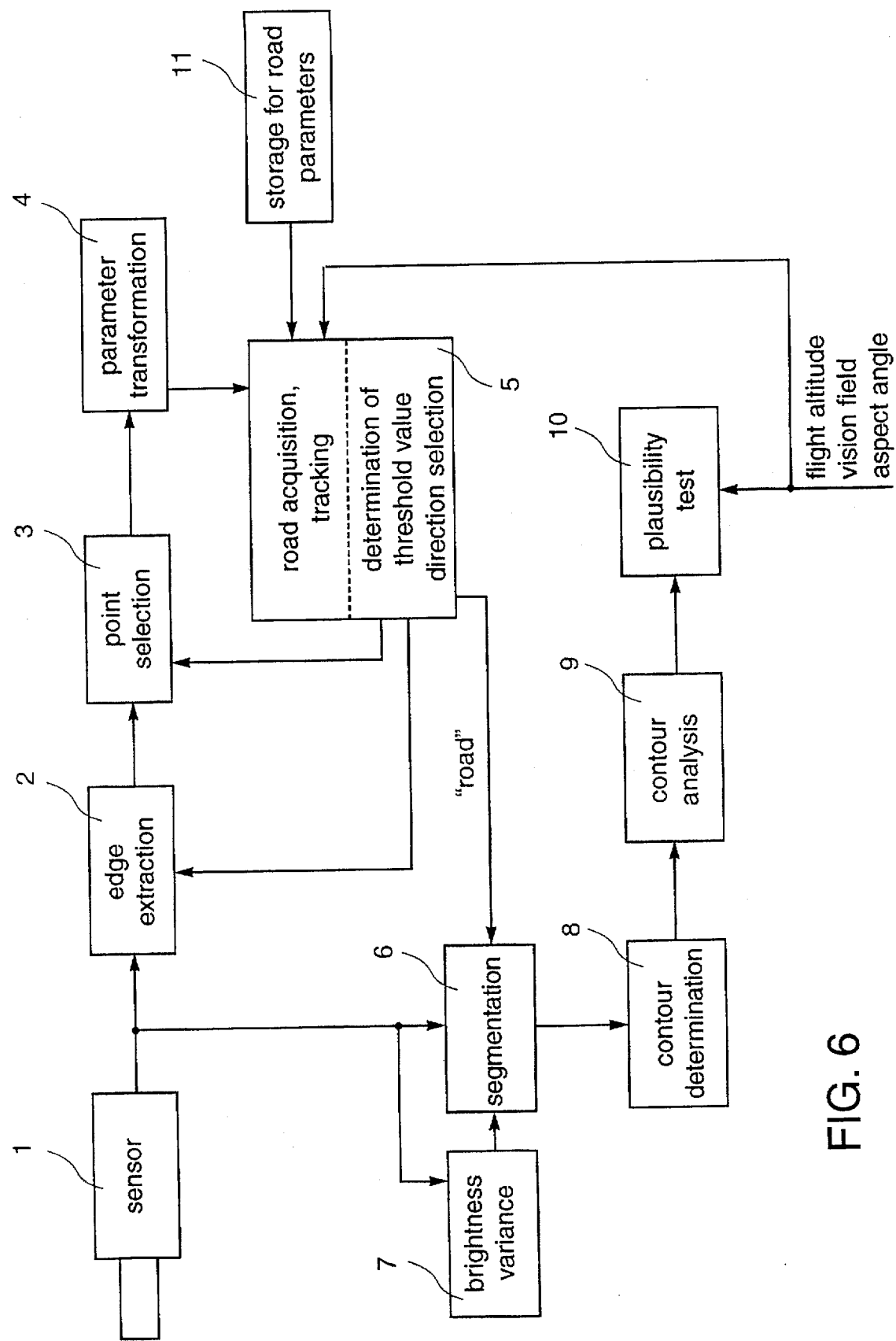
FIG. 6 shows a block wiring diagram of the device for the acquisition and approach of targets.

As shown in the drawing (FIG. 6), the manned or unmanned missile, according to mission planning (flight plan), has a preliminary briefing or given data concerning its course, its path, its velocity, etc., with which it roughly approaches the target area. When it has reached the target area—which is brought about by means of the inertial navigation system data—continuous recordings are made by the forward-looking sensor 1 and the individual image extracts are fed to an evaluating circuit containing an edge extractor 2, a point selector 3, and a parameter transformer 4. All aforementioned units are connected with the computer for target acquisition, particularly of road-like targets, and tracking or follow-up 5. This computer also carries out a threshold value determination (2 threshold values) and a direction selection in the edge extractor 2. It determines, with the aid of the extreme values in the parameter plane, whether or not a road structure corresponding to the stored road parameters is contained in the image.

Figure 5:
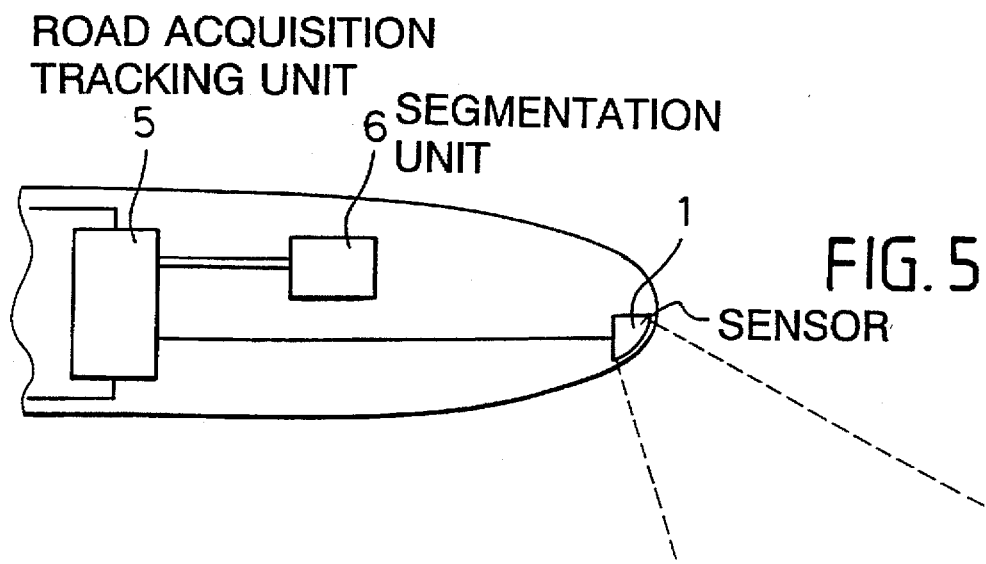
FIG. 5 shows a missile with target acquisition device.

The images recorded by the sensor, in this instance gray value images, are likewise fed to the segmentation unit 6 and/or to a unit 7 for detecting the variation of brightness, and the three-stage images with the gray values, brighter/road/darker, are supplied to the contour determination in the unit 8 from one or, better, from both units 6 and 7 and are analyzed in unit 9 and evaluated in unit 10. The units 6 to 10 constitute the main parts of the evaluating circuit for the target acquisition, while the target acquisition requires the sensor 1 as an additional main part installed in the missile and arranged therein so as to be stabilized with respect to attitude, as shown in FIG. 5. A further feature of the navigation device consists in that after the determination of the position of road segments and also of transversely extending segments (e.g. intersections) by means of the processing in stages 2–5, the relative arrangement of these segments is compared with the reference configuration stored in an expanded memory 11. By means of this comparison, which takes place in stage 5, the absolute position in the terrain is determined and transmitted to the missile guidance via a suitable output and utilized for improving the accuracy of an inertial navigation system, respectively. The alignment of a guided missile with inertial navigation system can be effected e.g. in the manner of DE-PS 36 22 064 and with the aid of the device described in the latter or similarly operating devices for aligning a missile with a reference position and/or zero position or absolute position, respectively, as starting point for necessary or desired measurements and/or other steps.

We claim:

1. Device for the acquisition and tracking of objects by means of characteristic features by which these objects are identifiable from a distance in the air in front of a background by means of an imaging sensor and a processing circuit for the signals obtained from the latter for comparison with reference signals stored beforehand, characterized by the combination of the following features:

a) output signals of an imaging sensor (1), which is stabilized with respect to attitude, are analyzed with respect to brightness gradients contained therein for extracting edge lines (2) of the object;

b) edge points are selected in a point selector (3) from the local extreme values of the brightness gradients by means of adaptive threshold value formation in the signal processing circuit;

c) edge points lying on a straight line are represented by local extreme values by means of a parameter transformer (4), which local extreme values characterize a straight line portion by means of their parameters;

d) the measured parameters are compared with the stored reference parameters (11) in an evaluating computer (5) while taking into account measured path data, and the results of the comparison are made available at its output for further processing;

e) the output signal of the sensor (1) is analyzed within a plurality of image sections for average brightness and variance;

f) a gray value histogram of edge points is calculated within a plurality of image sections;

g) two threshold values which divide up the brightness values into three words, bright/reference/dark, and thus convert the image into a three-stage image are calculated from the data from e) and f) for each of the image sections;

h) all image portions designated as "bright" or "dark" are roughly analyzed with respect to their magnitude, shape and position in order to determine whether or not they could be the sought target or whether or not possible target objects coincide with other objects and, if this is the case, the target objects are separated; and i) all possible target objects are accurately analyzed by means of shape, position and orientation features in order to determine whether or not they are sought targets.

2. Target acquisition device according to claim 1, characterized in that the target search can be switched in at least two stages from rough to precise in that the parameter gradation is reduced when determining the local extreme values.

3. Target acquisition device according to claim 1 or 2, characterized in that the accuracy of the target search is increased by repeating the individual search steps with a plurality of different image sections.

4. Target acquisition device according to claim 1, characterized in that after the comparison of the measured parameters with the stored parameters in the evaluating circuit by means of the computer, a plausibility test of the results is effected, with respect to magnitude, distance, position and frequency of the object, and in that interference objects are accordingly eliminated.

5. Target acquisition device according to claim 1, characterized in that only edge directions located at an expected direction within a predetermined tolerance range are taken into account in the processing in one of extracting edge lines (2) and point selector (3).

6. Target acquisition device according to claim 1, characterized by the imaging sensor (1), a signal processing circuit and an evaluating circuit comprising a computer for implementing a gray-value analysis of the output signals of the imaging sensor, wherein the signal processing circuit contains threshold value transmitters for the brightness in such a way that a sorting is effected in the signal evaluating circuit for the three values, bright/reference/ dark, a surface centroid or center of mass and contour features of the target are determined from this, by producing coordinates of the target and of its contour points, and, for the purpose of target acquisition according to the position finding the computer determines, by means of scanning the features, whether or not a sought target is concerned according to a decision tree and regulating of the hierarchical scanning, and also evaluates the mathematical sign of the obtained gradient image, for determining the target direction, and in that edge points lying on a straight line are also obtained in the computer in addition to a binary image—edges and non-edges—from one or more image sections.

7. Navigation device comprising means according to one of claim 1 or 6 for the acquisition of road structures, characterized in that the computer further processes the results obtained from the comparison of the measured parameters with the stored parameters in the evaluating circuit (2–5, 11) while taking into account the measured path data—as known per se—to form data for guidance of a missile for target tracking.

8. Navigation device according to claim 7, characterized in that use is made for acquisition and tracking objects moving on the ground along known lines.

9. Navigation device according to claim 7, characterized in that it serves for the acquisition and tracking stationary objects on the ground, in the form of one of bridges, antennae, hangars, polygons, prisms, spheres, comprising at least partially typical basic-shape elements.

* * * * *